Patented May 7, 1946

2,399,878

UNITED STATES PATENT OFFICE 2,399,878

METAL DERIVATIVES OF ALKYL PHENOLS

Carll F. Van Gilder and Helmuth G. Schneider, Roselle, N. J., assignors to Standard Oil Development Company, a corporation of Delaware No Drawing. Application July 14, 1944,
Serial No. 545,011

10 Claims. (Cl. 252—42.7)

This invention relates to an improved process of preparing or improving metal derivatives of alkyl phenols or their derivatives, as well as to the products thus prepared and to uses thereof. As a specific instance, the invention relates to the improvement of chemical compounds such as the barium salt of tertiary octyl phenol sulfide or disulfide, etc.

Chemical compounds of the class just referred to have been used as lubricating oil additives, particularly in heavy duty oils used for lubricating high speed Diesel and gasoline engines, for the reason that these additives have excellent detergent properties and improve the performance of the lubricant. As ordinarily prepared, these additives do, however, possess to some extent the undesirable property of being water-sensitive, that is, when very thoroughly contacted with a small amount of water, they form a sludge which may remain emulsified in the oil or settle out as a flocculent precipitate. This characteristic of the additive, while not affecting the performance of the oil, is nevertheless undesirable in certain respects such as in storage or handling where the oil is apt to become contaminated with water.

The primary object of the present invention is therefore to treat such additives during the process of manufacture in order to render them water-insensitive so that lubricating oils, or other products in which they may be used, will not tend to emulsify or form sludge when contacted with water. Another object is to make a water-insensitive product having good color.

Before discussing the particular improvements of this invention, the general manufacture of such products will be explained as applied, for example, to the treatment of alkylated hydroxy aromatic compounds, such as a tertiary octyl phenol with a sulfurizing agent, e. g. sulfur dichloride or sulfur monochloride, to form an alkyl hydroxy aryl sulfide which is then converted into a corresponding metal derivative by neutralization, preferably in oil solution, with a basic metal neutralizing agent such as barium hydroxide, thus forming a barium salt of an alkyl hydroxy aryl sulfide. Throughout this specification and the claims the word "sulfide" is used in a generic sense to include monosulfide, disulfide or polysulfide or mixtures of these, as well as polymers of the alkyl phenol sulfides. Such a process may be illustrated by the reaction of about 2 mols of tertiary octyl phenol with 1 mol, or a slight excess, of sulfur dichloride to produce tertiary octyl phenol sulfide. The reaction is preferably conducted in such solvents as dichlorethane, chloroform, petroleum naphtha, benzol, and the like. When preparing the alkyl phenol sulfides on a commercial scale, using technical grades of sulfur dichloride, ratios of 1.5 or so mols of $SCl_2$ to 2 mols of alkylated phenol will often be found desirable. In such a case, although the product may be expected to consist essentially of an alkyl phenol monosulfide, some quantities of polysulfide and of polymeric materials will also be found. (The tertiary octyl phenol is readily prepared by known methods by alkylating phenol with diisobutylene in the presence of suitable catalysts.) In practice, the phenol sulfide is then usually dissolved in a suitable mineral lubricating oil base stock in about 25 to 50%, usually about 40%, concentration, with or without incorporation of lesser amounts of other additives such as higher aliphatic alcohols, e. g., 5 or 6% of stearyl alcohol, or aliphatic nitriles, etc., used as defoamers, plasticizers, mutual solvents or as detergency promoters, and finally this solution is neutralized with the desired basic metal compound such as barium hydroxide octahydrate or monohydrate. The resulting product, after filtration, is a mineral oil concentrate of barium tertiary octyl phenol sulfide. Barium tertiary octyl phenol monosulfide may be represented by the general formula $Ba[O(C_8H_{17})C_6H_3]_2S$ or, if the tertiary octyl group is assumed to be in a position para to the phenolic oxygen, and the sulfur linkage in a meta position, by the following graphic formula:

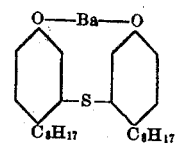

If the sulfur linkage is in an ortho position the graphic formula would be:

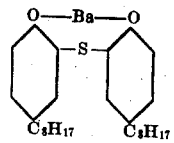

The exact location of the various radicals and linkages in such compounds has not been determined with certainty, but it is probable that the product resulting from the commercial operation of the described process is a mixture of compounds having the radicals and linkages in several different positions, there being possibly some sulfur linked in each of the ortho and meta positions, and some tertiary octyl groups in an ortho position or even in a meta position unless the original tertiary octyl phenol used is an absolutely pure para compound. Also it is more than likely that the commercial product which may be given the general formula $$Ba[O(C_8H_{17})C_6H_3]_2S_n$$

where $n$ has an average value of at least 1.0 and less than 2.0, contains at least small amounts of disulfide and polysulfide compounds as well as some polymeric material. In any event corresponding compounds may readily be made by starting with ortho or meta alkyl phenols and mixed alkyl phenols may be used with alkyl groups in any two or more positions. If desired, dialkyl phenols may also be used such as 2,4-ditertiary butyl phenol, 2,4-diamyl phenol, 2,6-diamyl phenol, ditertiary octyl phenol, etc. For some purposes it may even be desirable to use alkyl hydroxy aryl compounds having more than two alkyl groups, but the monoalkylated and dialkylated products are preferred.

The invention is considered to apply broadly to substituted metal phenolate compounds containing at least one grouping having the general formula M—Y—Ar(X)$_n$ where M is a metal, Y is an element in the righthand side of group VI of the Periodic Table (Mendeleeff), Ar is an aromatic nucleus which contains like or unlike substituents, X, $n$ in number, replacing nuclear hydrogen, $n$ being at least one.

M may be any metal, such as barium, calcium, aluminum, cobalt, chromium, magnesium, manganese, sodium, nickel, lead, tin, zinc, copper, iron, cadmium, potassium, lithium and the like, polyvalent, particularly divalent, metals being preferred.

The substitutents, X, may be organic, inorganic, or both, but at least one such group should be an element of the sulfur family or a group linked to Ar through such an element. The other substituents may be alkyl radicals or groups containing one or more of the non-metallic elements belonging to groups V, VI, and VII of the Periodic System (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like, or they may be organic radicals containing one or more of the inorganic groups.

In these salts, if only one of the valences of a polyvalent metal is connected to a substituted phenolic radical, such as —O—Ar(X)$_n$, the other may be connected to other organic groups or to inorganic constituents. For convenience, non-phenolic radicals or groups attached to the metal are indicated broadly by R in the following types of compositional formulae, which broadly represent metal derivatives of substituted phenolic compounds containing the characteristic compositional grouping described:

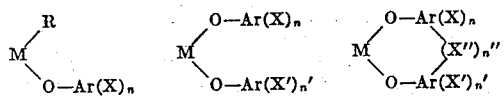

Where oxygen is shown in these formulae it may be replaced by sulfur, selenium or tellurium, as in the case of thiophenolic compounds.

Metal derivatives of the following illustrative types of substituted phenolic compounds are among those that can be used, in which R represents an alkyl group, preferably having at least 4 carbon atoms:

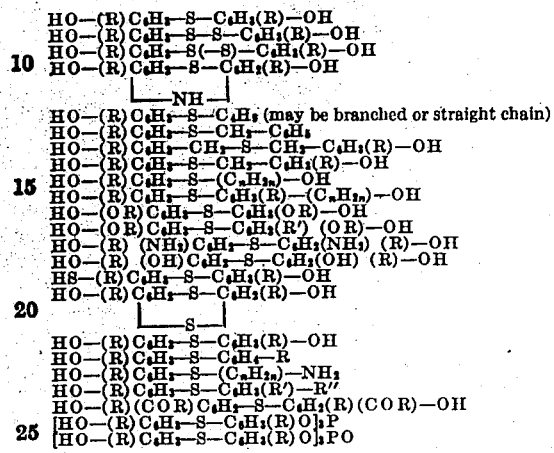

Such phenolate derivatives may also contain sulfur in other positions or groups at the same time as in the places shown in the formulae above. More broadly it may be stated that inorganic substituents, particularly negative inorganic groups containing non-metallic elements of groups V, VI, and VII of the Mendeleeff Periodic System, especially sulfur, beneficially influence the phenolates by increasing their potency for stabilizing the lubricating oils.

Especially preferred, because they are both very efficient and also lend themselves to easy and economical manufacture, are compounds containing at least one grouping having the general formula:

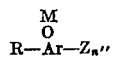

where Ar is an aromatic nucleus, R is an organic group, Z is a member of the sulfur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkenyl group, and preferably contains at least 4 aliphatic carbon atoms but may contain many more, such as 8, 10, 16, 18, 24, etc.

The configurations of the compounds are not limited to certain positions for the substituent groups, for these may be in ortho, para, or meta relations to one another. Also, the substituents, X, in broader formulae discussed previously in any aromatic nucleus may be alike or different.

The aromatic nucleus may be polycyclic as in naphthalene, phenanthrene, biphenyl, etc. Where oxygen occurs, it may be replaced by sulfur, selenium, or tellurium, as in the case of thio-phenolic compounds.

These metal phenolate sulfides are benefited in solubility and effectiveness as hydrocarbon lubricating oil blending agents when they contain a total of at least 5 and preferably 8 or more carbon atoms per molecule in aliphatic groupings.

Specific examples of preferred substituted phenolates falling into the classes mentioned, having at least one alkyl radical as a substituent, and using barium as example of a suitable metal, are formulated as follows:

I. Thioethers (monosulfides) of alkyl phenolates

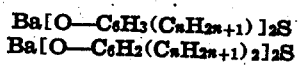

e. g., barium tertiary octyl phenol sulfide, barium tertiary amyl cresol sulfide, barium 2,4-ditertiary amyl phenol sulfide, and barium isohexadecyl phenol sulfide II. Disulfides of alkyl phenolates

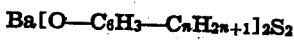

III. Phosphorus acid esters of alkyl phenol sulfides

e. g. salts of tertiary amyl phenol sulfide monophosphite

Other examples of metal alkyl phenol sulfides which may be treated in accordance with the present invention include: calcium tertiary amyl phenol sulfide, tin salts of wax alkylated salicylic acid sulfide, magnesium tertiary octyl phenol sulfide, and barium salts of $C_{16}$–$C_{20}$ branched chain alkyl phenol sulfides prepared from phenols alkylated with refinery butene polymers, etc. An example of a trivalent metal alkyl phenol sulfide is aluminum tertiary amyl phenol sulfide which may be represented in a general way by the formula $[(C_5H_{11}-C_6H_3-O)_2S]_3Al_2$ which may be written out more in detail as follows:

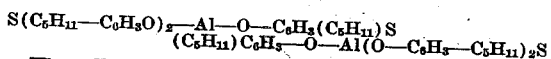

The alkyl hydroxy aryl compound should have more than three aliphatic carbon atoms and preferably more than 6, such as 8, 10, 12, etc., up to 24 or more as in the case of paraffinic radicals derived from paraffin wax or olefinic polymers, such as dimers, trimers, tetramers, etc., of isobutylene. Branched, especially highly branched, alkyl radicals are preferred.

Instead of using pure individual phenolic materials one may use crude commercial products which may be mixtures of two or more alkyl hydroxy aryl compounds, such as crude petroleum phenols which have an average chemical composition indicating the presence of four aliphatic carbon atoms and an amount of oxygen slightly in excess of that called for by the formula $C_4H_9C_6H_4OH$. Similarly crude phenolic materials of coal tar origin may be used such as the so-called tri-cresol which is a mixture of isomeric ortho, meta and paracresols, which should, of course, be further alkylated with a higher alkyl group, for best results from an oil-solubility point of view.

The sulfides, disulfides, etc., of such substituted phenols are generally made, according to known methods, by reaction of the alkyl hydroxy aromatic compound with a sulfurizing agent which is preferably a sulfur halide, e. g., $SCl_2$ or $S_2Cl_2$, a small amount of halogen perhaps being found to combine with the aromatic compound in some unknown manner, but the proportion of such combined halogen is very small and is not objectionable.

Before carrying out the neutralization of the alkyl hydroxy aromatic sulfide for converting the latter into the corresponding metal derivative or salt, the alkylated phenol sulfide is preferably dissolved in a lubricating oil base stock having a viscosity within the approximate limits of 35 to 70 seconds Saybolt at 210° F., derived from any suitable petroleum crude and having any desired viscosity index.

The basic metal neutralizing agent to be used is preferably a finely divided oxide or hydroxide of the desired metal such as an alkaline earth metal, e. g., calcium, barium, magnesium, etc. or other polyvalent metals such as nickel, cobalt, tin, lead, zinc, copper, cadmium, manganese, iron, chromium, aluminum, etc., or even monovalent metals such as sodium, potassium, lithium, etc. Metal carbides, sulfides, hydrides, and alkoxides may also be employed as agents for converting the phenol sulfides to metal salts.

The mixture is preferably stirred during this neutralization reaction, for a sufficient length of time to insure complete reaction, and ordinarily an excess of the basic metal neutralizing agent is used so as to insure incorporation of the metal atom in each molecule of the alkyl hydroxy aromatic sulfide, to produce for example a metal alkyl phenol sulfide. This solution is filtered to remove excess metal neutralizing agent and other insoluble particles (if any) to make an oil concentrate containing 10% to 50% by weight of the metal salt which may then be added to any desired lubricating oil base stock to give a finished blend containing about 0.05–2.0%, preferably 0.1 to 1.0% by weight of the metal salt per se.

In using the basic metal neutralizing agent, the reaction has heretofore generally been carried out at a temperature between the approximate limits of about 80° C. and about 220° C., for several hours, for instance, heating 1½ hours at 120° C. and finally ¼ or ½ hour at 150° C. to insure complete neutralization and to drive off water formed by the neutralization and has even been further heated to improve the product. For instance, in one case a metal salt of the type in question was heated in oil solution at 125° C. for 4 hours with nitrogen blowing; in another case a similar oil concentrate of the metal salt was heated for almost 35 hours at a temperature between about 180° C. and 210° C. Although in both of these cases the water sensitivity was reduced considerably by heat treatment, the results were not as good as could be desired. In the high temperature case the color of the oil blend was degraded to an unsatisfactory extent and even so the water sensitivity was not reduced as much as was desired. In another test in which the neutralization and heating were carried out in an open vessel which permitted ready removal of water vapor, the neutralization and heating were carried out at about 180° C. with a total heating time of about 3 hours, this heating being previous to filtering off any unreacted barium oxide or other insoluble material either present as impurities in the barium hydroxide or formed by the reaction. The product in this instance was fairly good, but this high temperature process is sometimes difficult to carry out on a commercial scale without degrading the color of the oil blend and at the same time presents certain mechanical and equipment difficulties, namely, that when the neutralization is carried out at 180° C. the evolution of water in the form of steam is so rapid as to cause very undesirable foaming and frothing of the reaction mixture, and means must be provided to take care of this difficulty. From an equipment point of view, such a high temperature process is undesirable unless high pressure steam lines are available to give a temperature as high as 180° C. (about 200 lbs. steam is required). If direct bottom fired kettles are employed, there is the attendant danger of burning or scorching the oil blends in immediate contact with the heated portion of the kettles unless considerable care is exercised.

Still further tests have shown that neutralization at a temperature of about 120° C. with a heat treatment as long as 10 to 20 hours at 150° C. will bring about a reduction in water sensitivity but that still greater reduction is desirable.

Now, according to the present invention, it has been found that if the neutralization and heat treatment are carried out under certain particular and critical conditions unexpectedly good results are obtained in producing a product of low water sensitivity and of good color and stability, while in addition the use of these conditions also presents certain practical advantages from an equipment and operating point of view.

Thus, according to this invention in carrying out the neutralization and heat treating procedure in order to obtain the maximum reduction in water sensitivity, the oil concentrate of metal salt must be heated at a temperature between the relatively narrow limits of 140° C. and 160° C. for a period of about 12 to 20 hours, and in the presence of at least 5–20%, preferably about 10%, excess barium hydroxide or other basic metal neutralizing agent, after which the reaction mixture is finally filtered and cooled. The exact time and temperature required vary somewhat with the particular salt used (i. e., calcium, barium, magnesium, zinc, etc.) and with the size of the batch being processed, the particular mode of carrying out a continuous treatment, the efficiency of agitation, etc. Generally a treatment of 14–18 hours at 150° C. is sufficient to eliminate the water-sensitivity of an oil concentrate of a metal alkylated phenol sulphide or disulphide salt without causing excessive color degradation of the oil blend. As mentioned above, the invention also has a number of advantages from a practical operating point of view, namely, that for heating to 150° C. by steam heating coils only 100 lbs. pressure of steam is required, whereas in order to heat to 180° C. much higher pressure steam is required, namely, about 200 lbs., and this requires the use of much stronger heat exchangers. An alternative method is the use of direct fired kettles in which fire is applied to the bottom of the kettles; and this has the very definite disadvantage that if the agitation is momentarily not sufficient some of the oil which is in immediate contact with the portion of the kettle being fired tends to scorch or char and this of course causes a darkening of the color of the oil.

Another great advantage from a practical point of view when employing the conditions of the present invention is that during the initial stages of the neutralization the rate of steam liberation from the water of neutralization or from the water of crystallization originally present in the barium hydroxide is not excessive, whereas when the neutralization is carried out at 180° C. there is too rapid an evolution of steam and the result is a very undesirable foaming and frothing of the entire oil blend, which may be troublesome in certain types of equipment. Expressed in other words, the great advantage to be gained in employing the conditions of the present invention is that the process may be carried out in many different types of equipment without too much attention to special features of design.

The exact reason for all of the unexpectedly favorable results obtained by this invention, and the exact mechanism of the operation of this invention, are not well understood, but it is believed that when the neutralization is initially carried out at 150° C. the manner in which the neutralization is actually effected chemically must be different from that resulting from neutralization at 120° C., and, on the other hand, the subsequent heat treatment at 150° C. for 12–20 hours gives more certain and reliable results in improvement of water-resistance and better color than operation at higher temperatures such as 180° C. or 210° C. The fact that neutralization at 120° C. followed by heat treating at 150° C. for 10–20 hours will not reduce the water sensitivity to a satisfactory degree is proof that the particular combination of conditions used in this invention, namely, neutralization at 150° C. followed by heat treating at the same temperature for about 12 to 20 hours, and in the presence of about 10 to 15% excess metal neutralizing agent, obtained a truly unexpected result which could not have been predicted from any of the work done heretofore.

It is desirable, in carrying out the present invention, to arrange the equipment so that removal of harmful constituents by evaporation, blowing with a gas, etc., may be facilitated. In batch operation this requires efficient stirring and the treatment should preferably be carried out in open vessels, or vacuum may be used. An inert gas such as nitrogen may be blown through the oil, either to serve as the means of agitation, or to supplement a mechanical agitator and to assist in removing undesired gases or vapors. For continuous operation, it is desirable to use vertical stripping towers with countercurrent flow of the detergent concentrate, such as the oil solution, fed in at the top of the tower and flowing down through it, while inert gases rise upwardly through the oil. When such a tower is used, the oil solution may either be sufficiently heated before entering the tower or may be heated by steam heating coils in the tower. Also, this tower may be used either without or with baffle plates, bubble trays or packing rings, etc. for assisting in providing intimate contact between the stripping gases and the oil solution. In all types of equipment, the use of scavenging agents such as high boiling hydrocarbons, alkylated phenol, straight chain alcohols, amines and the like accelerates the improvement in water-sensitivity.

The objects and advantages of the invention will be better understood from a consideration of the following examples:

*Example 1*

A series of tests was made in which tertiary octyl phenol sulfide was neutralized with barium hydroxide (octahydrate) by first dissolving the organic sulfide in about 36–37% concentration in a mineral lubricating oil base stock (solution vol. 700–900 gallons) derived from a Panhandle crude and having a viscosity of about 52 seconds Saybolt at 210° F., adding about 6% by weight of stearyl alcohol, heating the mixture to various neutralization temperatures and gradually adding the barium hydroxide with stirring, in some cases using an excess of the metal hydroxide and some not, and in some cases following the neutralization with a heat treatment at one of several temperatures, the resulting solution being filtered in all cases and then tested for water sensitivity and for Tag Robinson color. The water sensitivity test is carried out as follows: 2.5% by weight of the additive, meaning the concentrate blend of 40% by weight of barium tertiary octyl phenol sulfide in the mineral oil base stock, is dissolved in a suitable mineral lubricating base oil, such as one having a viscosity of about 52 seconds Saybolt at 210° F. to give 600 grams of finished blended mixture containing about 1% of metal salt; to this mixture is added 1% by weight of water. The mixture is vigorously agitated for 15 minutes at room temperature; 500 cc. of the resulting emulsion are placed in a graduate and allowed to settle for 24 hours at room temperature; at the end of the settling period the volume of the sludge settled in the bottom is recorded as the water sensitivity of the additive in question. The following table shows the conditions and results of this series of tests:

| Test No. | Neut. temp. | Heat temp. | Heat hours | Per cent excess metal hydroxide during heating | Water sens. cc./500 cc. | Tag Robinson color |
|---|---|---|---|---|---|---|
| | °C. | °C. | | | Cc. | |
| 1 | 120 | | 0 | | >75 | 4-5 |
| 2 | 120 | 150 | 10-20 | 5-20 | 25-50 | 3-4 |
| 3 | 120 | 200-220 | 10-30 | 0 | 15-25 | 1-2 |
| 4 | 150 | 150 | 10-20 | 5-20 | <5 | 2-3½ |

It will be noted from this series of tests that neutralization at 120° C. without any heat treating gave a product which had a water sensitivity greater than 75, which is very poor, and that heat treating at 150° C. with 5-20% excess metal hydroxide present produced a substantial improvement reducing the water sensitivity to between 25 to 50 cc., while heat treating at 200° C. to 220° C. without any excess metal hydroxide present produced a still further improvement in water sensitivity down to 15 to 25, although in this case the Tag Robinson color was degraded to a value below 2, which is undesirable, and finally it is noted that in test 4, representing the conditions of the present invention, where the neutralization was carried out at 150° C. and the reaction mixture was further subjected to heat treatment at 150° C. for 10 to 20 hours in the presence of 5-20% excess metal hydroxide, the water sensitivity was reduced to below 5, which is the most satisfactory product of these four tests. It is also noted that the Tag Robinson color was not degraded below 2, which is the minimum satisfactory limit.

*Example 2*

The barium salt of tertiary octyl phenol sulfide was made commercially according to this invention by neutralizing with 10% excess metal hydroxide at 150° C. and continuing the heating in the presence of the excess metal hydroxide for 16 hours. The commercial product of this process was of excellent water-resistance, showing a water sensitivity of less than 5 cc. of settled sludge in the test referred to above. The color of the finished product ranged from 2 to 2½ in 2.5% by weight blends in 52 seconds Saybolt at 210° F. blend oil and therefore is also satisfactory.

It is not intended that this invention be limited to the specific examples which have been given merely for the sake of illustration, nor unnecessarily by any theory as to the mechanism of the operation of the invention, but only by the appended claims in which it is intended to claim all novelty inherent in the invention as well as all modifications coming within the scope and spirit of the invention.

We claim:

1. Improved process for manufacturing metal salts which comprises dissolving in a mineral lubricating oil base stock a phenolic compound containing at least one grouping having the general formula $H-Y-Ar(X)_n$ where Y is an element in the righthand side of group VI of the periodic table, Ar represents an aromatic nucleus, X is a member of the sulfur family, $n$ is a number from one to five, heating the resulting solution to about 140° C.–160° C., adding thereto a basic metal neutralizing agent in an amount of about 5 to 20% excess over that required to neutralize said phenolic compound dissolved in the oil, amount to neutralize the dissolved phenolic compound, heating and stirring the mixture until the neutralization has been completed, and then still further heat treating the mixture for an additional length of time between about 12 and 20 hours at the same temperature, sufficient to substantially reduce the water-sensitivity of the metal salt in lubricating oil solution without degrading the color of said solution to an undesirable extent.

2. The process according to claim 1 in which the phenolic raw material contains at least one grouping having the general formula $$[H-Y-Ar(R)_n]_2-S_{n'}$$

where Y is an element in the righthand side of group VI of the periodic table, Ar is an aromatic nucleus containing one or more alkyl substituents R, $n$ indicating the number of such substituents, an $n'$ is a number from one to five.

3. The process according to claim 1 in which a metal salt mixture is made having an average chemical composition corresponding approximately to the general formula $$M[-O-C_6H_3(R)-]_2S_{n'}$$

in which M is a divalent metal, R is an alkyl group having at least 4 carbon atoms and $n'$ is a number from one to five.

4. The process of manufacturing an improved barium tertiary octyl phenol sulfide of low water-sensitivity when tested in mineral lubricating oil solution, which comprises dissolving tertiary octyl phenol sulfide in a mineral lubricating oil base stock in a concentration of about 10-50% by weight, heating the resulting solution to a neutralizing temperature of about 140°-160° C., gradually adding barium hydroxide with stirring, in an amount of about 5 to 20% excess over that required to neutralize the tertiary octyl phenol sulfide dissolved in the oil, heating the reaction mixture until neutralization has been completed, and then still further heating the reaction mixture for an additional heating time between the approximate limits of 12 hours and 20 hours at a temperature between about 140° C. and about 160° C. to reduce the water-sensitivity of said barium salt in lubricating oil solution to below about 5 cc./500 cc. and finally filtering the mixture.

5. Process according to claim 4 in which the neutralization and heat treatment are carried out at about 150° C. for about 16 hours and in the presence of about 10% excess barium hydroxide.

6. Process according to claim 4 in which a small amount of stearyl alcohol is dissolved in the oil with the tertiary octyl phenol sulfide before neutralization.

7. Substantially water-insensitive metal salts of good color formed by the process of claim 1.

8. A substantially water-insensitive barium tertiary octyl phenol sulfide, which is a heat treated neutralization product of barium hydroxide and tertiary octyl phenol sulfides made according to claim 4.

9. A lubricant comprising a major proportion of a mineral lubricating oil base stock and a small amount of a product made by the process defined in claim 1.

10. A lubricant comprising a major proportion of a refined mineral lubricating oil containing dissolved therein about 0.5 to 2.0% of an improving agent of low water-sensitivity made by the process defined in claim 4.

CARLL F. VAN GILDER.
HELMUTH G. SCHNEIDER.